Sept. 22, 1964        K. FRANCK        3,149,787
LUMINAIRE REFRACTOR
Filed Sept. 30, 1960        3 Sheets-Sheet 1
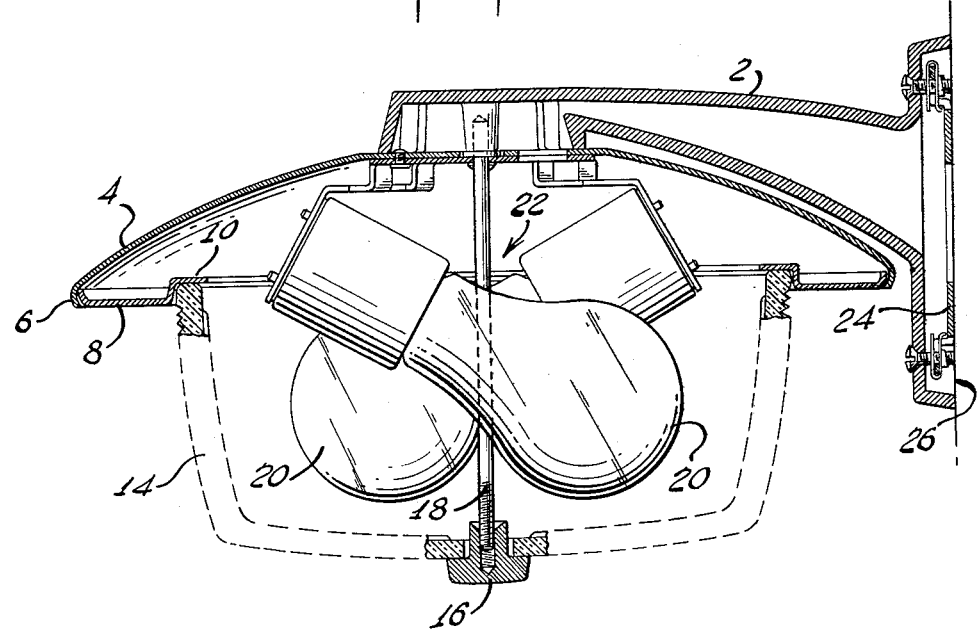
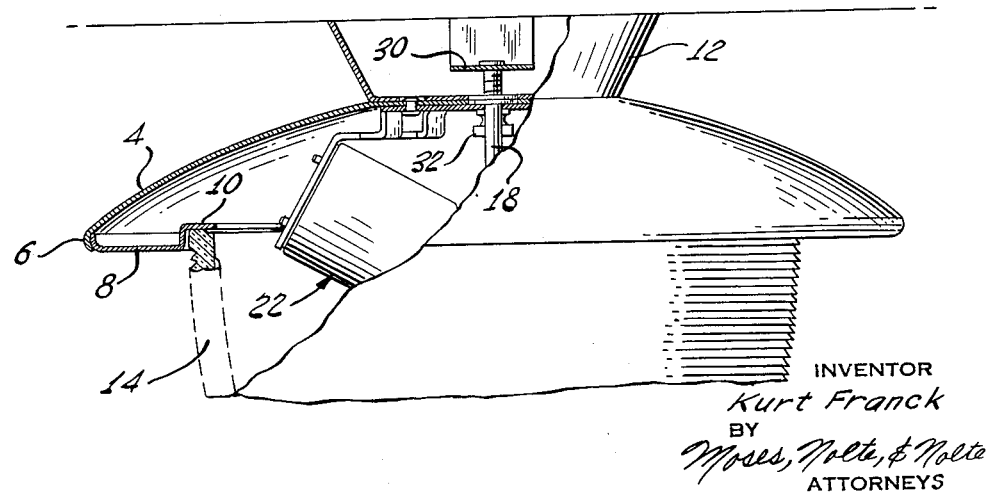
INVENTOR
*Kurt Franck*
BY
*Moses, Nolte, & Nolte*
ATTORNEYS

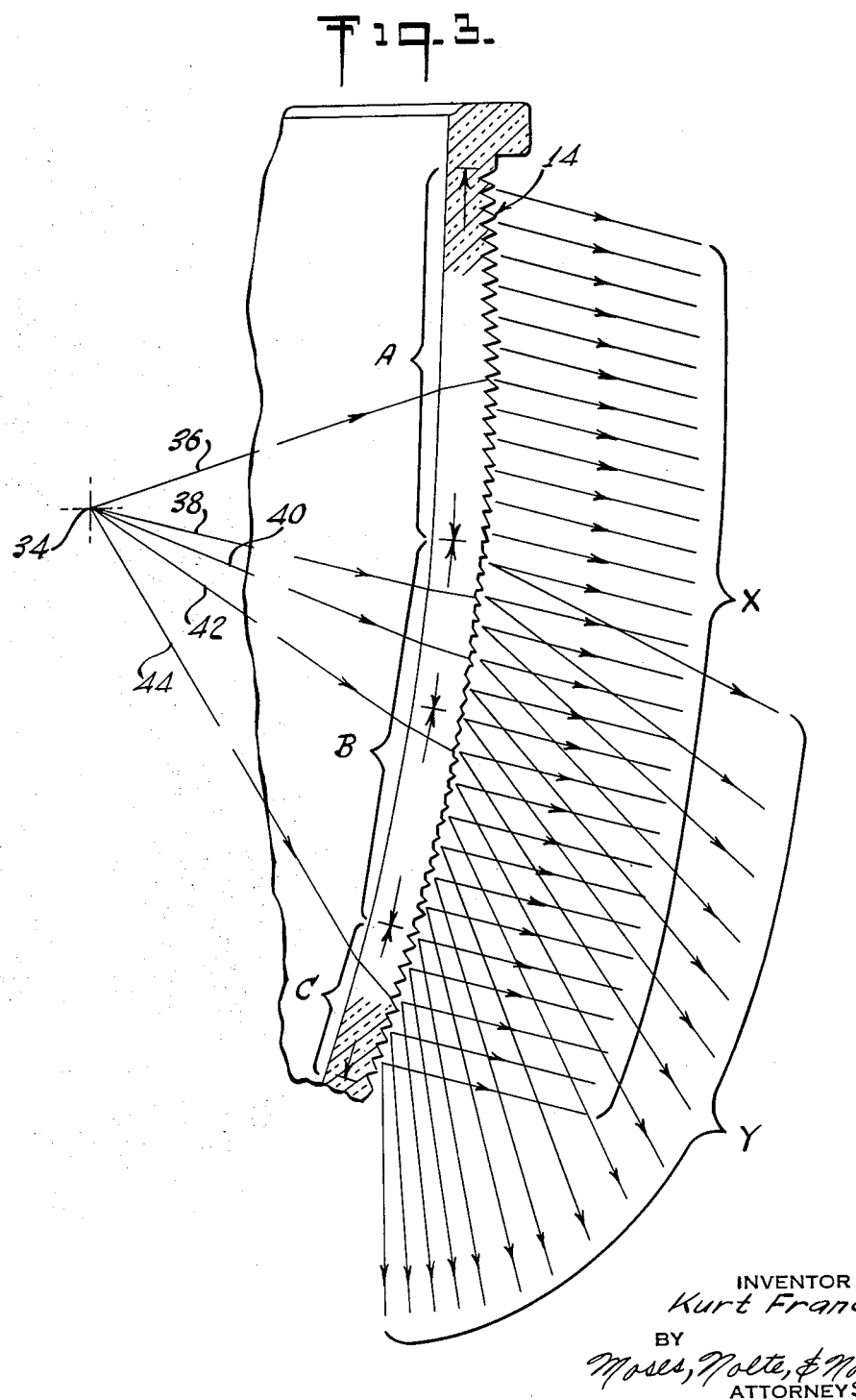

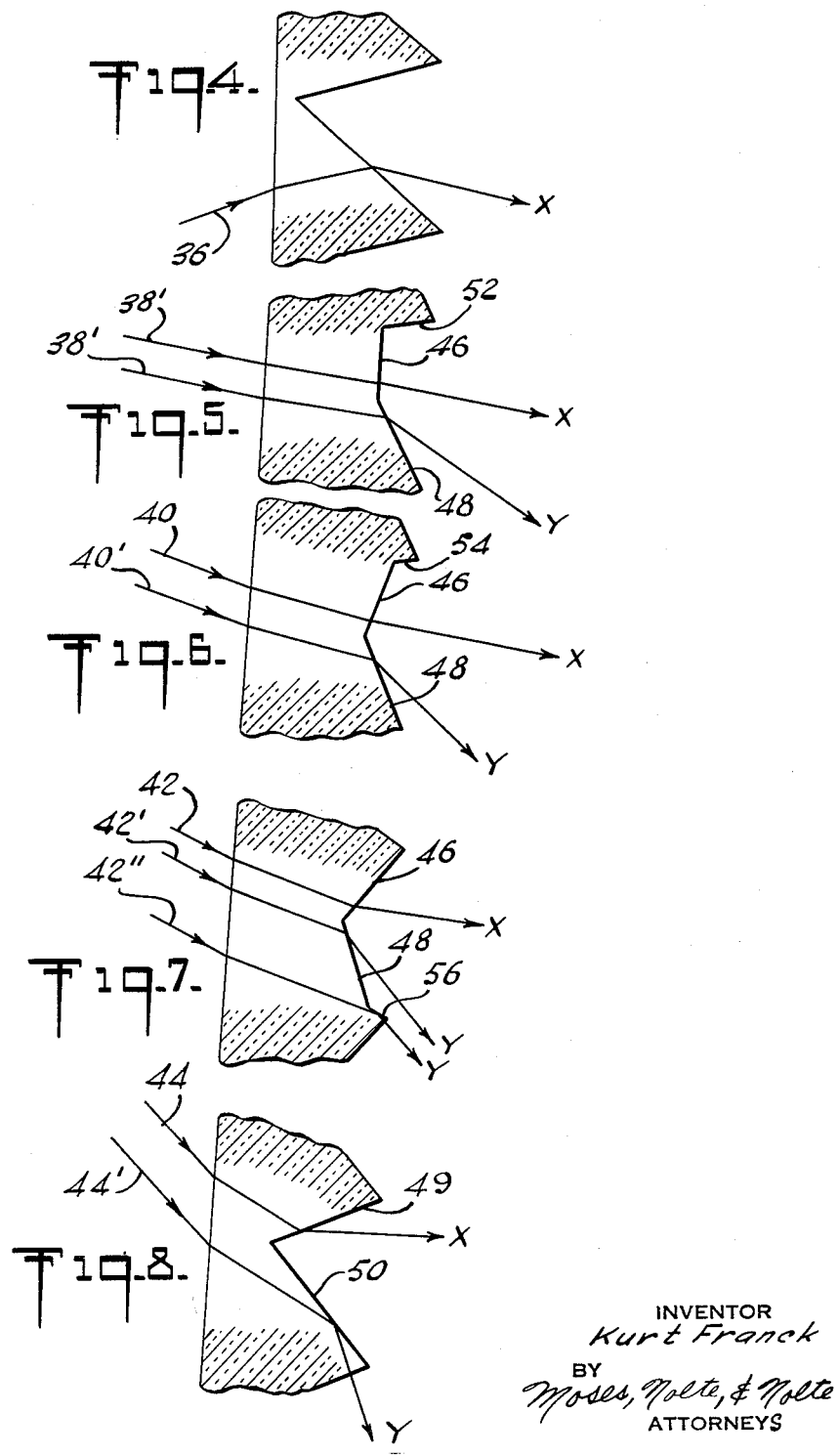

United States Patent Office 3,149,787
Patented Sept. 22, 1964

3,149,787
LUMINAIRE REFRACTOR
Kurt Franck, Newark, Ohio, assignor to Holophane Company, Inc., New York, N.Y., a corporation of Delaware
Filed Sept. 30, 1960, Ser. No. 59,572
3 Claims. (Cl. 240—106)

This invention relates to luminaires in general and in particular to improvements in prismatic refractors therefor.

The invention is particularly suitable for refractors used in luminaires for the residential field. In this field of lighting, very little has been done in the past in the way of light control with emphasis largely placed on the external unlighted appearance of the luminaire with nearly complete disregard to the light distribution performed and its importance in securing glare free installations.

The refractor of the present invention is readily adaptable to many luminaires and is designed to cast a glare free light on certain locations and at the same time to adequately illuminate the general vicinity of a fixture.

Normally in industrial or area lighting, the prime consideration is to obtain the largest amount of illumination over a given area, however, these objectives usually sacrifice visual comfort considerations when the observer looks toward the luminaire. The refractor of the present invention is designed to eliminate the harash glare so common in high intensity industrial lighting without sacrifice in efficiency. The invention accomplishes these objectives by the introduction of an array of second light beam components at angles below the main beam component. In most instances a typical main beam component of 70° to 80° above nadir is employed for optimum illumination. The present invention introduces a second component of smaller angle above nadir. This dual light distribution from the same refractor, from the same area of the refractor, eliminates monotony or flatness of uniform parallel beam lighting by producing variations in illumination on the lighted surfaces.

The prismatic structure of the invention is such that the refractor eliminates the prismless zone so typical of the prior Fresnel lens art. In this way, the external surface of the present novel refractor has a uniform prismatic appearance and is readily adaptable to modern appearing luminaires. The invention employs a substantially vertical refractor surface disposed about a typical incandescent lamp. The vertical refractor surface employs a novel combination of an upper zone of simple prisms, an intermediate zone of compound prisms, and a lower zone of simple prisms which act to both refract and reflect light in the desired angles. By eliminating the prismless zone of the prior art, which always appared brighter than the remainder of the lens, the present refractor presents an evenly illuminated and glare free appearance when viewed from a distance by an observer, thereby improving the overall visual comfort of the luminaire.

An object of the invention is therefore to provide an improved refractor for a residential type luminaire.

Another object of the invention is to provide a refractor having a series of prisms whose surfaces direct light rays in a main beam component and at angles below the main beam component.

Still another object of the invention is to provide an improved luminaire refractor which has a substantially uniform glass stock thickness.

Another object of the invention is to provide a refractor completely covered with prisms and having a glare free lighted appearance.

Another object of the invention is to provide a refractor which is simple in design, neat and uniform in appearance, durable in construction and economical to manufacture.

Other objects and advantages of the invention will become apparent and the invention will be fully understood from the following description and drawings in which:

FIG. 1 is a sectional view of the invention as embodied in a typical wall mounted residential luminaire;

FIG. 2 is a view similar to FIG. 1 showing the invention installed on a ceiling mounted fixture;

FIG. 3 is a partial vertical cross section of the novel portion of the refractor;

FIG. 4 is an enlarged sectional view of a typical prism in the upper zone of the refractor;

FIG. 5 is an enlarged sectional view of one form of compound prism in the intermediate zone of the refractor;

FIG. 6 is an enlarged sectional view of another compound prism in the intermediate zone of the refractor;

FIG. 7 is an enlarged sectional view of a typical prism in the lower portion of the intermediate zone; and FIG. 8 is an enlarged sectional view of a prism in the lower zone of the refractor.

Referring to the drawings in particular, the invention as embodied in FIG. 1 includes a wall bracket 2 which supports a dish shaped cover 4 having an inwardly turned circular lip portion 6 which overlaps and secures an edge of an annular refractor mounting plate 8. The plate 8 carries a recessed portion 10 adapated to receive the upper edge of a light controlling refractor 14. The refractor 14 is secured by a nut 16 and a depending bolt 18 to a portion of the bracket 2. A pair of incandescent lamps 20 are held in a dual socket arrangement shown generally at 22 which is held by rivets to the cover 4. The entire luminaire is attached by screws to a mounting plate 24 which is in turn secured to a vertical wall 26. In FIG. 2 an alternate form of fixture mounting is shown where a truncated conical spacer 12 seats upon the top of cover 4 and the entire assembly is held by a thumb nut 32 to a bracket 30 affixed to the ceiling surface. Spacer 12 is purposely not riveted to the cover 4 to allow the lamp assembly to be adaptable to either the wall mounting of FIG. 1 or the ceiling attachment of FIG. 2.

Referring to FIGS. 3–8 a more detailed appreciation of a novel prism structure may be obtained. A light center shown as 34 projects light rays 36, 38, 40, 42 and 44 at various angles onto the inner surface of the refractor 14. The upper zone A of the refractor has a plurality of substantially laterally extending simple prisms which reflect light in the manner shown in FIG. 4. As seen in FIG. 4, the upward ray 36 enters the refractor and emerges therefrom as a main beam component ray designated X. The direction of these main beam components is preferably in the range of 70 to 80° above nadir. Although only a single prism is shown in enlarged fashion in FIG. 4 it should be understood that many similar prisms are adjacent to it and emit rays X in parallel fashion. Below the upper zone A is an intermediate zone B of compound prisms, whose varying profiles are shown in FIGS. 5, 6 and 7. The upper portion of zone B (FIG. 5) carries a compound prism having faces 46 and 48. As the entering light ray 38, and its substantially parallel adjacent light ray 38', exit from the right hand surface of the refractor, it can be seen that ray 38 emerges in the main beam component direction as ray X while the ray 38' exits from the prism face 48 and is deflected downward in a below beam component ray Y. Similarly, in FIG. 6, light rays 40 and 40' exit respectively from prism surfaces 46 and 48 to create corresponding rays X and Y. Although ray X is parallel to ray X in FIG. 5, it should be noted that ray Y of FIG. 6 is at an increased angle below the main beam component than ray Y in FIG. 5.

Inspection of FIG. 7 will reveal the operation of the lower prism portion of zone B wherein rays 42, 42' and 42" are controlled respectively by prism surfaces 46, 48 and 56. Here again the exiting ray X is parallel to the main beam component while prism faces 48 and 56 provide the below beam components Y, Y. Prism face 56 acts to provide the below beam component ray Y by internal reflection rather than refraction as in the previous prism faces. Referring to FIG. 8 which represents a typical prism in zone C of the refractor, beams 44 and 44' are controlled by prism faces, respectively 49 and 50, to again supply the desired rays X and Y on the outside of the refractor. Also employed on the outside of the refractor as required are a plurality of compensating return steps numbered 52, 54 and 56. These return steps are employed to join adjacent prism faces where necessary so that a regressed prism structure results wherein increasing thickness of the refractor glass is not built up in order to produce the required prism angles. An understanding of this is easily obtained from FIG. 6 wherein it can be seen that prism face 48 is of a higher angle than its adjacent prism face 46 thus requiring a compensating face 54 to build up sufficient glass thickness above surface 54 so that a second adjacent surface similar to face 48 may be repeated above FIG. 6 without decreasing the minimum glass thickness of the next successive prism. In FIG. 7 this necessary compensating return step 56 is advantageously employed to supply a reflected beam component Y to enhance the overall intensity of the dual beam produced by the refractor.

Thus, it can be seen how the lower prism zones B and C contribute both a main beam component X and an array of below beam components Y which fan-out at divergent angles from one another. The upper portion of the novel refractor has produced a supplementing main beam component while the lower area has produced the dual beam light dispersion of the invention. No substantial area exists, upon the outside of the refractor face, which is prismless thereby avoiding any bright spots in the overall appearance of the luminaire. Similarly, because the refractor projects the below beam rays Y at an increased angle from the nadir, less likelihood exists that an observer viewing the luminaire from a low angle will see any dark spots on the refractor surface. The invention has provided a novel refractor which employs an extended area of interlaced prism faces which produce rays of light in two directions to accomplish improved illumination. Because, in the lower portion of the refractor, the prism faces 50 are employed in a reflecting manner rather than a refractive manner, increased glass thickness may be maintained in the lower area. This results in maintaining a more uniform overall thickness which in turn overcomes many manufacturing difficulties.

While a specific embodiment of the invention has been shown and described in detail to illustrate the application of the invention principles, it will be understood that the invention may be embodied otherwise without departing from such principles. For instance, the refractor construction need not necessarily be a figure of revolution, but could just as readily be a trough-like structure about a tubular light source. Those skilled in the art will also appreciate other obvious modifications of the novel prismatic refractor.

What is claimed is:

1. In the combination, in a luminaire of a light source and a refractor, said light source producing a radiantly emitted vertical sector of light, said refractor including a vertically oriented wall portion extending above and below said light source and in the path of the sector of light, the improvement comprising a system of horizontally oriented vertically adjacent prisms on said wall portion, said system of prisms substantially covering said wall portion from top to bottom and each prism thereof including a first surface varying in angular orientation from one said prism to the next from the top of said wall portion to the bottom thereof so as to direct substantially all of the light of the sector incident thereon into a parallel beam at a predetermined downward vertical angle, each of the lower and intermediate of said prisms including a second surface varying in angular orientation from one to the next so as to direct the light of the sector incident thereon into a vertically downward divergent beam at angles from the angle of the parallel beam down toward a nadir, said intermediate prisms between the upper and lower prisms including a third surface connecting said first and second surfaces of said vertically adjacent prisms and forming a regressed prism structure in the intermediate area of said wall portion, the uppermost of said third surfaces being substantially inactive and the lowermost of said third surfaces reflecting light from the sector incident thereon downwardly and outwardly into the divergent beam to form a part thereof.

2. In the combination, in a luminaire, of a light source and a refractor, said light source producing a radiantly emitted vertical sector of light, said refractor including a vertically oriented wall portion extending above and below said light source and in the path of the sector of light, the improvement comprising a system of horizontally oriented vertically adjacent prisms on said wall portion, said system of prisms substantially covering said wall portion from top to bottom and each prism thereof including a first surface varying in angular orientation from one prism to the next from the top of said wall portion to the bottom thereof so as to direct the light of the sector incident thereon into a parallel beam at a predetermined downward vertical angle, some of said prisms including a second surface varying in angular orientation from one prism to the next so as to direct the light of the sector incident thereon into a vertically downwardly divergent beam at angles from the angle of the parallel beam down toward a nadir, the intermediate prisms of said horizontally oriented prisms between the uppermost and lowermost prisms thereof including a third surface connecting said first and second surfaces of said vertically adjacent prisms and forming a regressed prism structure in the intermediate area of said wall portion, the upper most of said third surfaces being substantially inactive.

3. Refractor means for controlling a radiantly emitted sector of light when disposed relative thereto and comprising wall means for intercepting said sector of light, a plurality of side by side prisms on said wall means from one end thereof to the other, each said prism having first surface means for disposition at varying angles from one end of said wall means to the other end for directing the light from the sector incident thereon into a parallel beam, the prisms at one end of said wall means and those substantially centrally thereof having second surface means for disposition at varying angles for directing the light from the sector incident thereon into a divergent beam at angles from the angle of the parallel beam in the direction toward said one end of said wall means, the prisms located substantially centrally of said wall means include third surface means connecting said first and the second surface means and forming a regressed prism structure in the central area of said wall means, said third surface means toward the other end of said side wall means being substantially inactive, said third surface means located adjacent said prisms on said one end of said wall means being disposed at such angles so as to reflect light from the sector of light incident thereon outwardly into the diverging angles of the divergent beam.

References Cited in the file of this patent

UNITED STATES PATENTS

| | | |
|---|---|---|
| 538,193 | Fredereau | Apr. 23, 1895 |
| 804,254 | Mygatt | Nov. 14, 1905 |
| 1,644,915 | Dorey | Oct. 11, 1927 |
| 2,566,126 | Franck | Aug. 28, 1951 |
| 2,675,466 | Baker | Apr. 13, 1954 |
| 2,814,723 | Franck et al. | Nov. 26, 1957 |
| 2,886,698 | Dorman | May 12, 1959 |
| 2,967,928 | Wolar | Jan. 10, 1961 |